(12) United States Patent
Cohen

(10) Patent No.: US 7,639,764 B2
(45) Date of Patent: Dec. 29, 2009

(54) METHOD AND APPARATUS FOR SYNCHRONIZING DATA BETWEEN DIFFERENT CLOCK DOMAINS IN A MEMORY CONTROLLER

(75) Inventor: Daniel Scott Cohen, Baltimore, MD (US)

(73) Assignee: Atmel Corporation, San Jose, CA (US)

( * ) Notice: Subject to any disclaimer, the term of this patent is extended or adjusted under 35 U.S.C. 154(b) by 730 days.

(21) Appl. No.: 11/206,474

(22) Filed: Aug. 17, 2005

(65) Prior Publication Data

US 2007/0041264 A1    Feb. 22, 2007

(51) Int. Cl.
  *H04L 7/00*    (2006.01)
  *H04L 7/02*    (2006.01)
(52) U.S. Cl. ............................. 375/354; 375/355
(58) Field of Classification Search .......... 375/354–376
  See application file for complete search history.

(56) References Cited

U.S. PATENT DOCUMENTS

| | | | | |
|---|---|---|---|---|
| 4,851,710 A | * | 7/1989 | Grivna | 327/155 |
| 4,949,361 A | * | 8/1990 | Jackson | 375/371 |
| 5,155,745 A | * | 10/1992 | Sugawara et al. | 375/360 |
| 5,256,912 A | * | 10/1993 | Rios | 327/144 |
| 5,379,401 A | | 1/1995 | Robinson et al. | |
| 5,388,248 A | | 2/1995 | Robinson et al. | |
| 5,422,855 A | | 6/1995 | Eslick et al. | |
| 5,548,620 A | * | 8/1996 | Rogers | 375/354 |
| 5,638,015 A | * | 6/1997 | Gujral et al. | 327/144 |
| 5,857,005 A | * | 1/1999 | Buckenmaier | 375/357 |
| 6,009,496 A | | 12/1999 | Tsai | |
| 6,055,285 A | * | 4/2000 | Alston | 375/372 |
| 6,128,678 A | * | 10/2000 | Masteller | 710/52 |
| 6,154,788 A | | 11/2000 | Robinson et al. | |
| 6,157,967 A | | 12/2000 | Horst et al. | |

(Continued)

FOREIGN PATENT DOCUMENTS

WO    WO-2007022368 A2    2/2007
WO    WO-2007022368 A3    2/2007

OTHER PUBLICATIONS

Smith, Scott F., et al., "Low-latency Multiple Clock Domain Interfacing Without Alteration of Local Clocks", *Proceedings, IEEE 15th Biennial University/Government/Industry Microelectronics Symposium (UGIM '03)*, [online]. [archived Jan. 22, 2007]. Retrieved from the Internet: <http://web.archive.org/web/20070122062851/http://coen.boisestate.edu/ssmith/coen/UGIM03.pdf>, (Jun. 30 - Jul. 2, 2003), 342-343.

*Primary Examiner*—Jason M. Perilla
(74) *Attorney, Agent, or Firm*—Schwegman, Lundberg & Woessner P.A.

(57) ABSTRACT

The present invention provides method and apparatus for synchronizing data between different clock domains in a memory controller. In one embodiment, a memory controller is provided that includes a command decoder and synchronizing logic. The command decoder is operable to receive a command in accordance with a first clock domain. The synchronizing logic synchronizes the command to a second clock domain that is different from the first clock domain, and includes a first synchronization flop and a second synchronization flop operable to prevent metastability associated with synchronizing the command to the second clock domain.

13 Claims, 5 Drawing Sheets

U.S. PATENT DOCUMENTS

| | | | |
|---|---|---|---|
| 6,260,152 B1 * | 7/2001 | Cole et al. ................. 713/400 |
| 6,308,229 B1 * | 10/2001 | Masteller .................... 710/52 |
| 6,359,479 B1 * | 3/2002 | Oprescu .................... 327/141 |
| 6,434,684 B1 * | 8/2002 | Manning .................... 711/167 |
| 6,584,540 B1 | 6/2003 | Shinmori |
| 6,714,612 B1 * | 3/2004 | Chaudry .................... 375/368 |
| 6,738,917 B2 * | 5/2004 | Hummel et al. ............ 713/400 |
| 6,754,765 B1 | 6/2004 | Chang et al. |
| 6,778,436 B2 | 8/2004 | Piau et al. |
| 6,848,060 B2 * | 1/2005 | Cook et al. ................. 713/400 |
| 7,058,799 B2 * | 6/2006 | Johnson ..................... 713/400 |
| 7,219,250 B2 * | 5/2007 | Abendroth et al. ......... 713/400 |
| 7,242,737 B2 * | 7/2007 | Lake et al. ................. 375/372 |
| 7,352,836 B1 * | 4/2008 | Mendenhall ................ 375/372 |
| 7,366,938 B2 * | 4/2008 | Warren et al. ............... 713/400 |
| 2003/0067814 A1 | 4/2003 | Piau et al. |
| 2003/0079077 A1 | 4/2003 | Piau et al. |
| 2003/0131185 A1 | 7/2003 | Dover |
| 2003/0169644 A1 * | 9/2003 | Liao ........................... 368/233 |
| 2003/0210603 A1 * | 11/2003 | Ong ........................... 365/233 |
| 2004/0049627 A1 | 3/2004 | Piau et al. |
| 2005/0280455 A1 * | 12/2005 | Hutson ....................... 327/156 |
| 2006/0036888 A1 * | 2/2006 | Warren et al. ............... 713/600 |
| 2006/0098770 A1 * | 5/2006 | Harper et al. ............... 375/356 |
| 2006/0168423 A1 * | 7/2006 | Nolan et al. ................. 712/11 |
| 2006/0277329 A1 * | 12/2006 | Paulson et al. ............... 710/39 |

\* cited by examiner

METHOD AND APPARATUS FOR SYNCHRONIZING DATA BETWEEN DIFFERENT CLOCK DOMAINS IN A MEMORY CONTROLLER

FIELD OF THE INVENTION

The present invention relates to electrical circuits, and more particularly to synchronization and sleep circuits in a memory controller.

BACKGROUND OF THE INVENTION

Modern electronic systems typically contain many components including, for example, processors (or microcontrollers), main boards, memories, storage, graphics processors, and the like. One goal of manufacturers is to improve performance by increasing the speed at which an electronic system operates. Consequently, processor speed has increased steadily over the years.

Performance improvements of the various components in electronic systems, however, have not all been related to speed improvements. As a result, certain parts of an electronic system may run at different speeds (or clock frequencies) relative to one another. For example, a user interface of an electronic system (for receiving user commands) may be asynchronous (i.e., operating at a different clock frequency or an independent clock frequency) relative to a processor, memory controller or bus in the electronic system. In addition, the operating speed of the processor, may change during operation, e.g., for power conservation.

As discussed above, one example of an operational mismatch in speed can occur between a user interface, and a processor and memory controller within an electronic system—i.e. the user interface may operate at a user clock frequency that is different from a system digital clock frequency associated with the processor and memory controller. If the processor manages synchronization of data (received through the user interface) between the user interface and the memory controller, then performance throughout the electronic system may decline. By offloading the synchronization of data to the memory controller, performance for the system can be improved.

Accordingly, what is needed is method and apparatus for synchronizing data between different clock domains in a memory controller. The present invention addresses such a need.

BRIEF SUMMARY OF THE INVENTION

The present invention provides method and apparatus for synchronizing data between different clock domains in a memory controller. In one embodiment, a memory controller is provided that includes a command decoder and synchronizing logic. The command decoder is operable to receive a command in accordance with a first clock domain. The synchronizing logic synchronizes the command to a second clock domain that is different from the first clock domain, and includes a first synchronization flop and a second synchronization flop operable to prevent metastability associated with synchronizing the command to the second clock domain.

Particular implementations can include one or more of the following features. The command can be a multi-bit command. The synchronizing logic can further include a comparator to compare a value of the multi-bit command in the first synchronization flop to a value of the multi-bit command in the second synchronization flop to determine if all bits of the multi-bit command have transferred to the second clock domain. The synchronizing logic can further include a command lookup table for determining whether the multi-bit command is a valid command. The memory controller can further include a microcontroller operable to process the multi-bit command, wherein the synchronizing logic generates a sync clock signal for the microcontroller that substantially matches a frequency associated with the second clock domain. A frequency associated with the second clock domain can be lower than a frequency associated with the first clock domain.

In general, in another aspect, a method for synchronizing data between different clock domains in a memory controller is provided. The method includes receiving a command in accordance with a first clock domain; and synchronizing the command to a second clock domain that is different from the first clock domain, including using a first synchronization flop and a second synchronization flop in the memory controller to prevent metastability associated with synchronizing the command to the second clock domain.

According to a method and apparatus disclosed herein, in one embodiment, a synchronization circuit is provided that synchronizes a command from a user interface to a memory controller. Commands received by the memory controller may include direct user commands and "timed" event commands. Direct user commands are executed by a command decoder in the memory controller, for example, operating at a clock frequency associated with a user interface. Timed event commands involve multiple steps and are typically executed by a microcontroller operating at a different, lower frequency than the clock frequency associated with the user interface. In one embodiment of the present invention, the synchronization occurs, for timed event commands, in two registers that receive the command and compare the version of the command received. If they match and the command is valid, the command is considered synchronized and a microcontroller is awoken for executing the command. Upon completing the command, a flag is set and the microcontroller is put back to sleep.

The details of one or more embodiments are set forth in the accompanying drawings and the description below. Features and advantages will be apparent from the description and drawings, and from the claims.

BRIEF DESCRIPTION OF SEVERAL VIEWS OF THE DRAWINGS

Like reference symbols in the various drawings indicate like elements.

DETAILED DESCRIPTION OF THE INVENTION

The present invention relates to a method and apparatus for synchronizing data between different clock domains in a memory controller. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
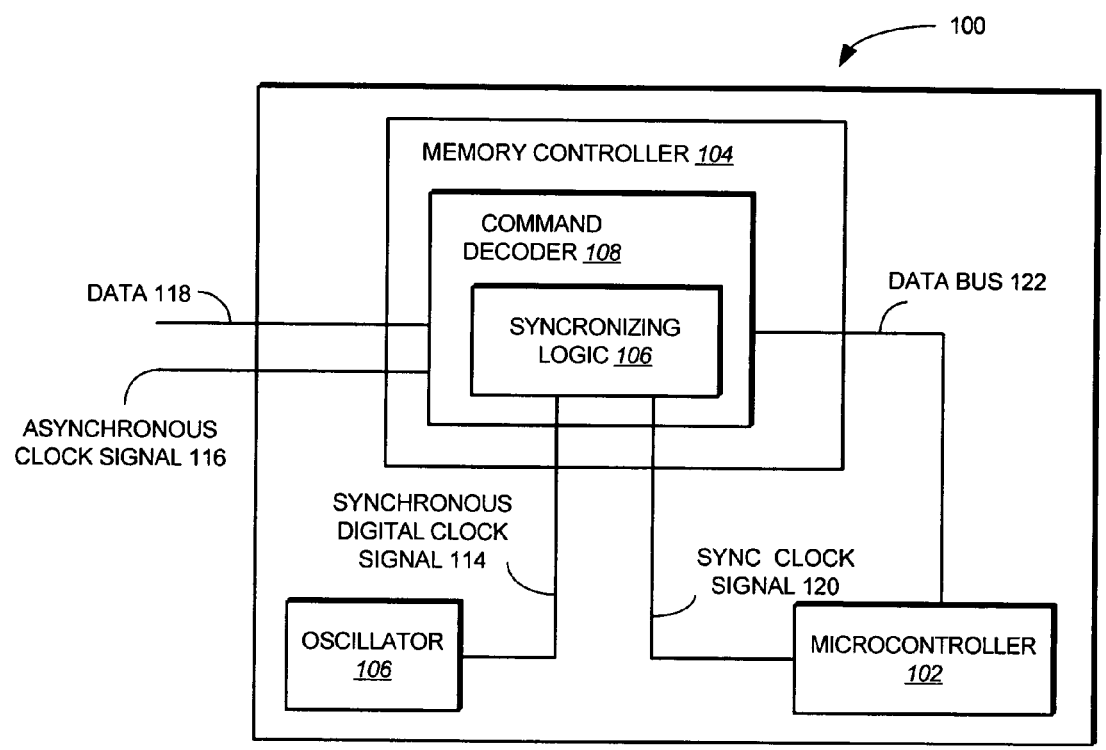
FIG. 1 is a block diagram illustrating a system including a synchronization logic block in accordance with one embodiment of the invention.

FIG. 1 is a block diagram illustrating a system 100 according to one embodiment of the invention. The system 100 includes a microcontroller 102, a memory controller 104, and an oscillator 106.

The microcontroller 102 is coupled to the memory controller 104. The memory controller 104 can be any type of digital memory controller, for example, a digital flash memory controller. The oscillator 106 within the system 100 provides a synchronous digital clock signal 114 to the memory controller 104, as well as other components (not shown). There may be more than one clock signal within the system 100.

Memory controller 104 includes a command decoder 108. The command decoder 108 receives data 118, e.g., from a user interface (not shown). In one embodiment, the data 118 includes direct user commands and timed event commands. Direct user commands are commands that can be handled directly by the command decoder 108. Timed event commands are generally composed of a complex sequence of steps that require use of the microcontroller 102. The data 118 can be received by the command decoder 108 in accordance with an asynchronous clock signal 116. The asynchronous clock signal 116 has a different frequency relative to the synchronous digital clock signal 114.

The memory controller 104 determines how a command will be executed, whether by the microcontroller 102 (or equivalent) and/or, for example, a statemachine (not shown) depending upon application requirements. If the command is simple (e.g., a direct user command), the command decoder 108 only may be used to execute the command. If the microcontroller 102 is needed to execute a more complex command, for example, a timed event command, then the memory controller 104 synchronizes the command from a first clock domain associated with the asynchronous clock signal 116 to a second clock domain associated with the synchronous digital clock signal 114. In one embodiment, the memory controller 104 synchronizes the command to the second clock domain as follows. Synchronizing logic 106 within the command decoder 108 synchronizes the command to the second clock domain, as discussed in greater detail below, and generates a sync clock signal 120 that substantially matches a frequency of the synchronous digital clock signal 114. In one implementation, the sync clock signal 120 is a gated version of the synchronous digital clock signal, as described in greater detail below. The microcontroller 102 then processes the (complex) commands in accordance with the sync clock signal 120. The sync clock signal 120 may be generated for and within the memory controller 104 or it may be provided by the system 100 for use by the memory controller 104 and other components (not shown). Accordingly, in one embodiment, the command decoder 108 operates at both clock frequencies of the asynchronous clock signal 116 and the synchronous digital clock signal 114.

In one embodiment, the synchronizing logic 106 synchronizes and checks the validity of a command, and then wakes the microcontroller 102 (as discussed in greater detail below with respect to FIG. 2), which processes the command. A flag may be used to indicate that the microcontroller 102 is busy, so no other (new) commands should be issued until the current command clears. Once the microcontroller 102 completes processing of the current command, the flag may indicate that the memory controller 104 is ready to receive further commands. In one embodiment, the microcontroller 102 is put to sleep after a command has been processed by turning off the clock to the microcontroller 102—e.g., by suspending the sync clock signal 120—thus providing energy conservation. Although the synchronizing logic 106 is illustrated as a subset of the command decoder 108, in another embodiment, the synchronizing logic 106 may be separate from the command decoder 108 and act as an interface.

Figure 2:
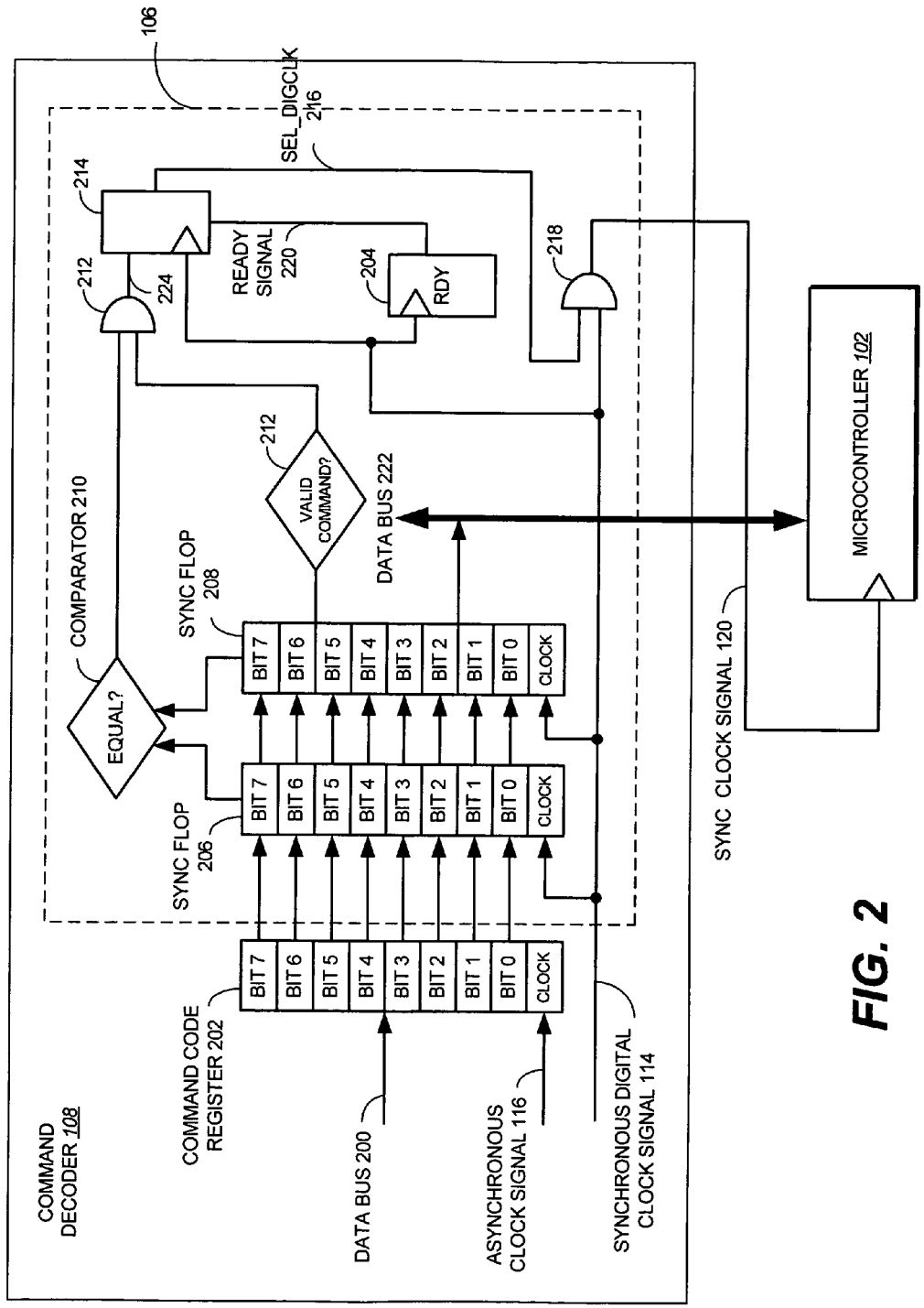
FIG. 2 is a block diagram illustrating one embodiment of the synchronization logic block of FIG. 1.

FIG. 2 is a block diagram illustrating one embodiment of the command decoder 108 including the synchronizing logic 106. In one embodiment, the synchronizing logic 106 includes both synchronization and sleep logic that forms a bridge between a user interface (not shown) and logic associated with the memory controller 104 (shown in FIG. 1). For simplicity, the remainder of the command decoder 108 is not illustrated.

The synchronizing logic 106 synchronizes data, e.g., timed event commands (and other data or commands requiring a microcontroller or like device), which are made up of a complex sequence of steps typically processed by a microcontroller (e.g., microcontroller 102). The sequence of events upon receiving and identifying such a command follows. The command is loaded into a command code register 202 through a data bus 200 in accordance with the asynchronous clock signal 116. In one embodiment, the command is a multi-bit command (e.g., 8-bits), and the data bus 200 is a multi-bit (e.g., 8-bit) data bus. Because the command code register 202 operates according to the asynchronous clock signal 116, the memory controller 104 accepts command at a user's desired clock frequency, e.g., by immediately sending a ready signal to the user interface based on the asynchronous clock signal 116. The memory controller 104, therefore, does not have to wait for the command to be synchronized to the (e.g., slower) cycling clock frequency associated with the synchronous digital clock signal 114.

After the command is loaded into the command code register 202, a ready (RDY) register 208 is reset to indicate that the command code register 202 (and, therefore, the microcontroller 102) is busy. The RDY register 202 receives the synchronous digital clock signal 114. The command code register 202 transmits the command to a conventional two flop synchronizer, including a first synchronization flop 206 and a second synchronization flop 208. More specifically, the command is first transmitted to the first synchronization flop 206, and then transmitted to the second synchronization flop 208. The command is further retransmitted from the command code register 202 to the first synchronization flop 206. In one embodiment, each of the synchronization flops 206-208 is clocked according to the synchronous digital clock signal 114.

In addition to the two flop synchronizer, synchronizing logic 106 further includes a comparator 210 and a command lookup table 212. In particular, the comparator 210 compares bus values within each of the synchronization flops 206-208 protect against metastability problems at the domain interface to insure that all bits of the command have crossed to the clock domain associated with the synchronous digital clock signal 114. For example, what may happen is that only a part of a command is sent during a single transfer, with the remainder of the command sent during the next transfer. The first part of the command received may be a valid but incomplete command. Thus, in order to verify synchronization, the command in each of synchronization flops 206-208 is compared by a comparator 210, and if equal then the command is fully synchronized to the clock domain associated with the synchronous digital clock signal 114. If the commands are not equal, then synchronization flop 208 contains only a first part of the command (propagated during the initial transfer) while the first synchronization flop 206 contains only a second part of the command. The command does not propagate further until the bus values are equal in both of the synchronization flops 206-208. The command is also further checked for validity by the command lookup table 212. The command lookup table 212 verifies that the command is within the set of allowed values—i.e., a valid command.

Assuming a synchronized and valid command, an AND gate 212 passed a high value (sync_done signal 224) to a synchronization complete register 214, which is clocked by the synchronous digital clock signal 114. The synchronization complete register 214 transmits a sel_digclk signal 216 to an AND gate 218 indicating that synchronization is complete and the microcontroller 102 is activated. In particular, the AND gate 218 receives as inputs the synchronous digital clock signal 114 and the sel_digclk signal 216. Once the sel_digclk signal 216 goes high, AND gate 218 sends a sync clock signal 120 to activate the microcontroller 102. Accordingly, sync clock signal 120 represents a gated version of the synchronous digital clock signal 114 and, therefore, substantially matches a frequency of the synchronous digital clock signal 114.

In one embodiment, prior to receiving the sync clock signal 120 at a clock input, the microcontroller 102 operates in a sleep mode and, therefore, consumes less power than when active. Upon awakening, the microcontroller 102 executes commands where it left off. In one embodiment, instructions cause the microcontroller 102 to execute a loop of the following: poll the command code register 202, execute any command present, and set the RDY register 204 to high (indicating that the microcontroller 102 is ready to process a command).

As soon as the command code register 202 is polled, the command is read by the microcontroller 102 and execution of the command begins. The microcontroller 102 begins executing the command as soon as the microcontroller 102 is activated because the command is already synchronized and valid, as determined earlier. In this manner power is saved as the microcontroller 102 is active for only as long as is needed to poll the command register 202, execute the command, and set the RDY register 204 high. Once the RDY register 204 goes high, a ready signal 220 indicates the microcontroller 102 is ready, or no longer busy. In one embodiment, the RDY register 204 is on the data/address bus 222 of the microcontroller 102 and can be written by firmware. The RDY register 204 may also be written by a user in debug/evaluation mode through a command decoder user interface (not shown). Such a debug/evaluation mode permits a user (or test engineer) to asynchronously put the microcontroller 102 to sleep. Thus, the microcontroller 102 can be stopped in the middle of processing a command and the user can analyze important metrics, including values of internal registers, and even restart the microcontroller 102 while continuing to observe an instruction bus or address bus. Such an mode of operation can be useful for debugging purposes, for example, if the microprocessor 102 appears to hang and the ready signal 220 never goes high (indicating that the microprocessor Is ready to process another command).

The ready signal 220 from the RDY register 204 resets the synchronization complete register 214, which then deasserts the AND gate 216 and suspends the sync clock signal 120 to the microcontroller 102, putting the microcontroller 102 to sleep.

Figure 3:
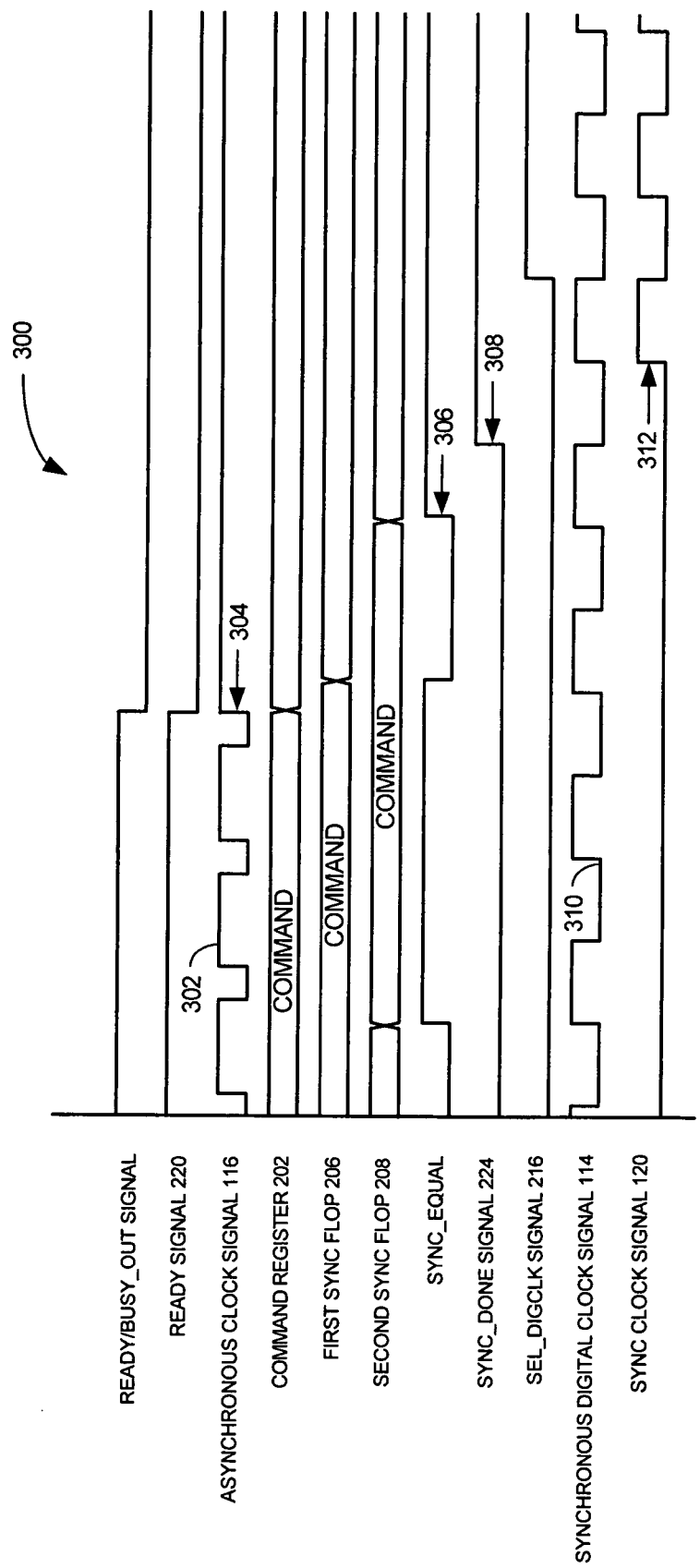
FIG. 3 is a timing diagram illustrating start and synchronization of a command according to one embodiment of the invention.

FIG. 3 is a timing diagram 300 illustrating start and synchronization of a command according to one embodiment of the invention. FIG. 3 will be discussed in conjunction with FIG. 2. In FIG. 3, the asynchronous clock signal 116 is represented by waveform 302. A point 304 indicates a time at which a command has been identified (e.g., as a timed event command), and the ready signal 220 from register 204 goes low, indicating that microcontroller 102 is busy. Also, a signal—ready signal_out—can be sent to a user interface indicating that the microcontroller 102 is busy.

Once the command is received in the first synchronization flop 206 and the second synchronization flop 208, and compared and found to be equal (indicating synchronization is complete) then at point 306 a flag (sync_equal) goes high to indicate that synchronization is equal. In one embodiment, the sync_equal flag is the output of comparator 210.

Once the command is validated, a flag (sync_done 224) goes high at point 308 indicating that synchronization of the command is complete. In one embodiment, the flag sync_done 224 is the output of AND gate 212.

The synchronous digital clock signal 114 is represented by waveform 310. At the falling edge of waveform 310 following point 308, a flag (sel_digclk 216) to select the digital clock signal goes high at an input to the AND gate 218. In one embodiment, the flag sel_digclk 216 (to activate the sync clock signal 120 for the microcontroller 102) is asserted on the falling edge of the synchronous digital clock signal 114 to ensure that the sync clock signal 120 for the microcontroller 102 is turned on and off while the synchronous digital clock signal 114 is low to prevent glitching (or false clocks). Accordingly, the microcontroller 102 is put to sleep by activating a clock signal (e.g. sync clock signal 120) to the microcontroller 102. Thus, at point 312, the sync clock signal 120 for the microcontroller 102 is activated (through the output of AND gate 218), which substantially matches a frequency of waveform 310 (of the synchronous digital clock signal 114). The microcontroller 102 is turned on and executes the command in the command register 202.

Figure 4:
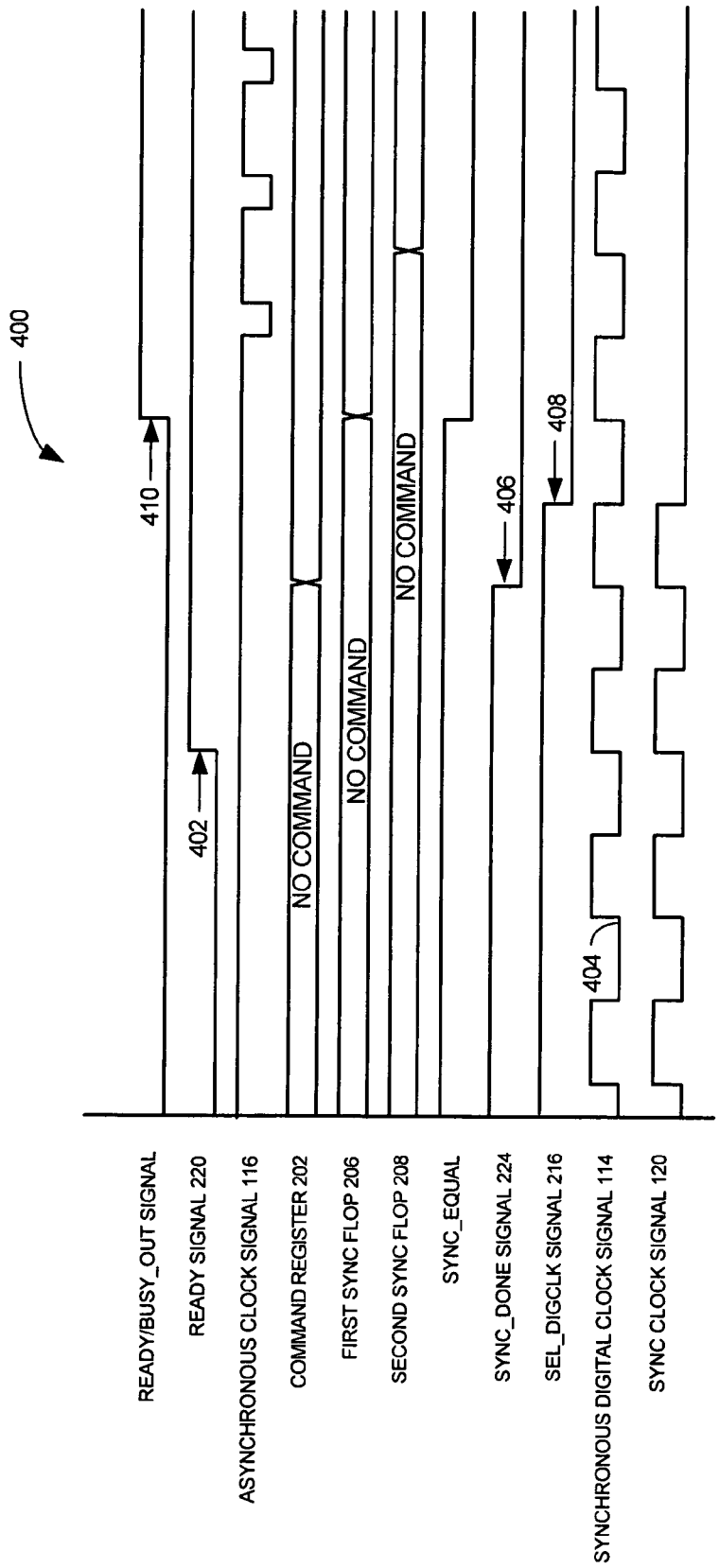
FIG. 4 is a timing diagram illustrating end of a command and entering sleep mode according to one embodiment of the invention.

In one embodiment, after a command in the command register 202 is processed by the microcontroller 102, the microcontroller 102 enters a sleep mode. FIG. 4 illustrates a timing diagram 400 illustrating signals during the time that the microcontroller 102 completes of processing of a command and enters sleep mode according to one embodiment of the invention. When the microprocessor 102 completes processing a command, the microcontroller 102 resets the RDY register 204, which causes the ready signal 220 (for example, the output of register 208) to go high at a point 402.

A waveform 404 represents the synchronous digital clock signal 114. One clock cycle of the waveform 404 after the point 402, the synchronization complete register 214 receives the ready signal 220 and is reset, and, therefore, the sync_done signal 224 goes low at a point 406. On the next falling edge of the waveform 404 following the point 406, the sel_digclk signal 216 goes low at a point 408, deactivating the output of the AND gate 218 and the sync clock signal 120 to the microcontroller 102. Thus, at point 408 the microcontroller 102 is turned off until reactivated.

In one embodiment, at the point 410, the ready signal_out goes high indicating to, e.g., an external user interface that the microcontroller 102 is ready to process more commands.

Figure 5:
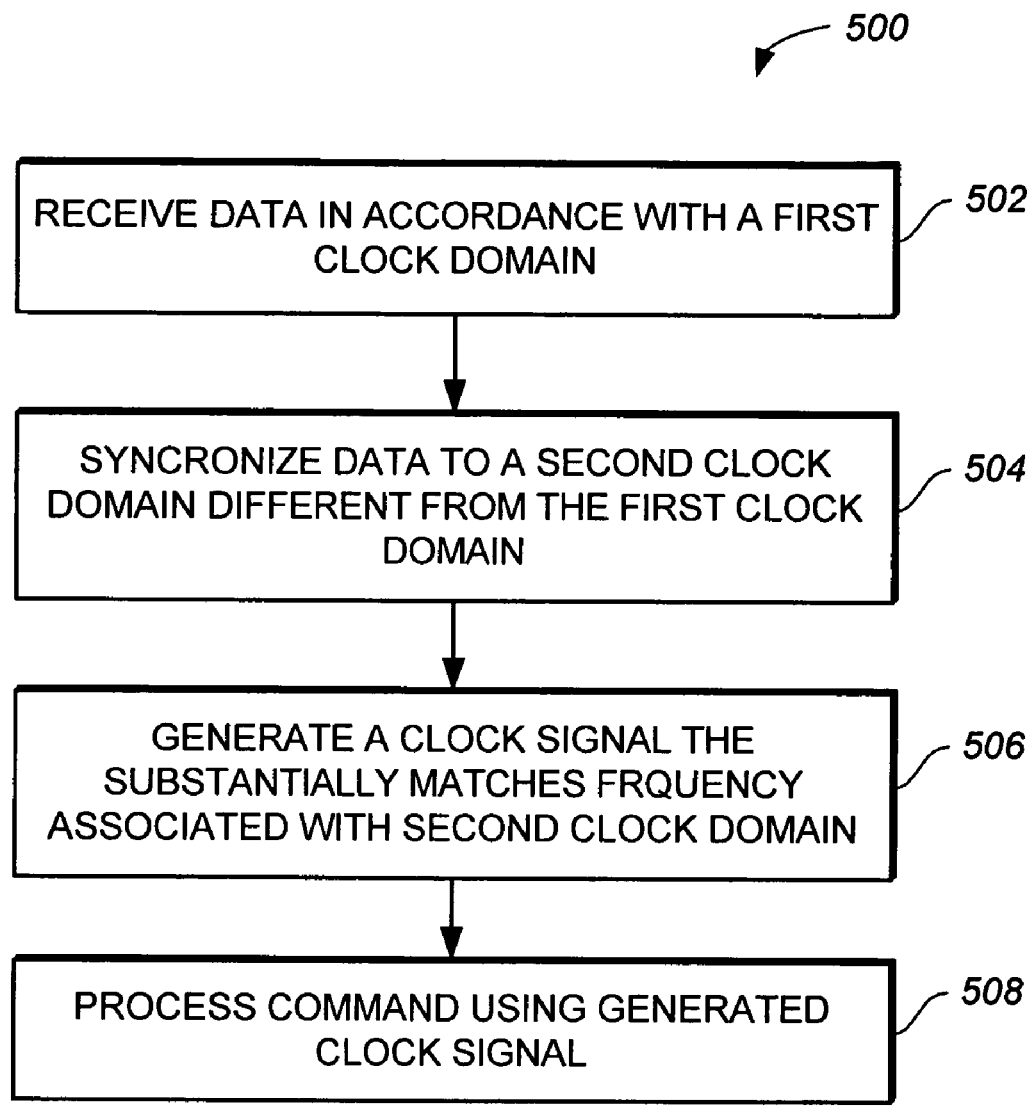
FIG. 5 is a flowchart illustrating a method for synchronizing data between different clock domains in a memory controller.

FIG. 5 illustrates a method 500 for synchronizing data between different clock domains in a digital controller (e.g., memory controller.104). Data is received by a command decoder (e.g., command decoder 108) in accordance with a first clock domain (step 502). In one embodiment, the data includes commands, as discussed in greater detail above. The data is synchronized to a second clock domain that is different from the first clock domain (e.g., using synchronizing logic 106) (step 504). Once the synchronizing is complete, a clock signal (e.g., sync clock signal 120) is generated that substantially matches a frequency of associated with the second clock domain (step 506). The data is then processed (e.g., by microcontroller 102) using the generated clock signal (step 508).

Advantages of the invention include the integration of firmware and user access to a ready flag (or ready signal 220) and ties the flag to the synchronization logic 106. By making the ready flag an integral part of the sleep and synchronization logic, a user of a memory controller may be notified immediately that the memory controller is busy (in accordance with a user clock) without having to wait for a command to be synchronized to a clock domain associated with the memory controller. The memory controller may read and write a ready register (RDY register 204, for example) while making the ready register responsive to the asynchronous user domain. The microcontroller 102 may be activated (awoken and put to sleep) based on the state of the ready flag and the state of synchronization.

Further advantages may include that the microcontroller 102 is turned off when there are no commands present that require processing by the microcontroller 102. This is a power-saving feature useful in low power battery operated systems. Also, the asynchronous clock signal is decoupled from the microcontroller 102, allowing the microcontroller 102 to run at a set speed that is different from the asynchronous clock signal. This provides for more rapid response to commands even where multi-cycle timed events will occur because the ready signal can be dropped by the command decoder 108 before the microcontroller 102 recognizes the command or is even awake.

In one embodiment of the invention, the command decoder 108 is the interface between the user and the synchronous memory controller 104. An advantage to this is that clock domain crossings can be managed in one place—i.e., within the command decoder 108. This allows for a simpler interface between the user clock and the system clock, and makes it easier to reliably send signals between the two different clock domains. It also makes realization of the clock tree simpler and simplifies timing constraints used in synthesizing and checking timing on the system. Overall, system reliability may be improved.

According to the method and apparatus disclosed herein, the present invention provides a method and apparatus for synchronizing data between different clock domains in a memory controller. The present invention has been described in accordance with the embodiments shown, and one of ordinary skill in the art will readily recognize that there could be variations to the embodiments, and any variations would be within the spirit and scope of the present invention. For example, any type of multi-bit data (other than commands) can be synchronized between different clock domains. Also, the synchronizing and sleep techniques can be used in other types of digital controllers other than a memory controller. Further, a statemachine can be implemented in place of the microcontroller 102 to process commands (e.g., timed event commands). Accordingly, many modifications may be made by one of ordinary skill in the art without departing from the spirit and scope of the appended claims.

What is claimed is:

1. A memory controller comprising:
    a command decoder operable to receive a multi-bit command in accordance with a first clock domain; and
    synchronization logic operable to synchronize the multi-bit command to a second clock domain that is different from the first clock domain, wherein the synchronization logic includes,
    a first synchronization flop;
    a second synchronization flop coupled to the first synchronization flop, the first and second synchronization flops operable to prevent metastability associated with synchronizing the multi-bit command to the second clock domain;
    a comparator operable to compare a value of the multi-bit command in the first synchronization flop to a value of the multi-bit command in the second synchronization flop to determine if all bits of the multi-bit command have transferred to the second clock domain; and
    a command lookup table operable to determine whether the multi-bit command is a valid command.

2. The memory controller of claim 1, further comprising:
    a microcontroller operable to process the multi-bit command, wherein the synchronizing logic generates a sync clock signal for the microcontroller that substantially matches a frequency associated with the second clock domain.

3. The memory controller of claim 2, wherein the synchronizing logic further includes:
    a ready register coupled to the microcontroller, the ready register operable to indicate when the microcontroller is available to process a given command;
    a synchronization complete register coupled to the ready register, the synchronization complete register operable to indicate when the microcontroller should receive the sync clock signal; and
    an AND gate coupled to the microcontroller and to the synchronization complete register, the AND gate to transmit the sync clock signal to the microcontroller while receiving an assert signal from the synchronization complete register, otherwise not transmitting the sync clock signal, wherein the microcontroller is asleep when not receiving the sync clock signal.

4. The memory controller of claim 3, wherein the synchronization complete register further indicates that the microcontroller is busy after the comparator determines that the multi-bit command is a valid command.

5. The memory controller of claim 4, wherein the multi-bit command is a timed event command, a timed event command being a command composed of a complex sequence of steps that require use of the microcontroller.

6. The memory controller of claim 1, wherein a frequency associated with the second clock domain is lower than a frequency associated with the first clock domain.

7. A method for synchronizing data between different clock domains in a memory controller, the method comprising:
    receiving a multi-bit command in accordance with a first clock domain; and
    synchronizing the multi-bit command to a second clock domain that is different from the first clock domain, including,
    using a first synchronization flop and a second synchronization flop in the memory controller to prevent metastability associated with synchronizing the multi-bit command to the second clock domain;

comparing a value of the multi-bit command in the first synchronization flop to a value of the multi-bit command in the second synchronization flop to determine if all bits of the multi-bit command have transferred to the second clock domain; and determining whether the multi-bit command is a valid command.

8. The method of claim 7, further comprising:

generating a sync clock signal that substantially matches a frequency associated with the second clock domain; and processing the multi-bit command using a microcontroller based on the generated sync clock signal.

9. The method of claim 8, further comprising:

indicating when the microcontroller is available to process a given multi-bit command by asserting a ready flag; and suspending the sync clock signal to the microcontroller when the ready flag is asserted.

10. The method of claim 9 further comprising:

indicating that the microcontroller is busy after determining that the multi-bit command is a valid command.

11. The method of claim 10, wherein the multi-bit command is a timed event command, a timed event command being a command composed of a complex sequence of steps that require use of the microcontroller.

12. The method of claim 7, wherein a frequency associated with the second clock domain is lower than a frequency associated with the first clock domain.

13. A method comprising:

receiving multi-bit data in accordance with a first clock domain in a register;

transferring the multi-bit data from the register to a first synchronization flop;

transferring the multi-bit data from the first synchronization flop to a second synchronization flop in accordance with a second clock domain;

comparing the data in the first synchronization flop to the data in second synchronization flop, and, if the all the data bits of have not been transferred to the second clock domain, transferring the data from the first synchronization flop to the second synchronization flop for a second time; and determining whether the multi-bit data is valid data.

* * * * *

UNITED STATES PATENT AND TRADEMARK OFFICE
CERTIFICATE OF CORRECTION

| | |
|---|---|
| PATENT NO. | : 7,639,764 B2 |
| APPLICATION NO. | : 11/206474 |
| DATED | : December 29, 2009 |
| INVENTOR(S) | : Daniel S. Cohen |

It is certified that error appears in the above-identified patent and that said Letters Patent is hereby corrected as shown below:

On Sheet 1 of 5, in Figure 1, in Reference Numeral 106, line 1, delete "SYNCRONIZING" and insert -- SYNCHRONIZING --, therefor.

On Sheet 5 of 5, in Figure 5, in Reference Numeral 504, line 1, delete "SYNCRONIZE" and insert -- SYNCHRONIZE --, therefor.

On Sheet 5 of 5, in Figure 5, in Reference Numeral 506, line 1, delete "THE" and insert -- THAT --, therefor.

On Sheet 5 of 5, in Figure 5, in Reference Numeral 506, line 2, delete "FRQUENCY" and insert -- FREQUENCY --, therefor.

In column 10, line 12, in Claim 13, delete "flog" and insert -- flop --, therefor.

In column 10, line 15, in Claim 13, after "if" delete "the".

In column 10, line 16, in Claim 13, after "bits" delete "of".

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,639,764 B2  
APPLICATION NO.   : 11/206474  
DATED             : December 29, 2009  
INVENTOR(S)       : Daniel Scott Cohen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Twenty-first Day of December, 2010

David J. Kappos  
*Director of the United States Patent and Trademark Office*